(12) United States Patent
Bauch et al.

(10) Patent No.: US 8,203,248 B2
(45) Date of Patent: Jun. 19, 2012

(54) ELECTRIC MOTOR

(75) Inventors: Christa Bauch, Grossbottwar (DE); Ole Berkefeld, Ludwigsburg (DE); Martin Schulz, Kornwestheim (DE); Ngoc-Thach Nguyen, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 12/746,123

(22) PCT Filed: Oct. 15, 2008

(86) PCT No.: PCT/EP2008/063826
§ 371 (c)(1),
(2), (4) Date: Aug. 31, 2010

(87) PCT Pub. No.: WO2009/071374
PCT Pub. Date: Jun. 11, 2009

(65) Prior Publication Data
US 2010/0320865 A1    Dec. 23, 2010

(30) Foreign Application Priority Data
Dec. 3, 2007   (DE) .......................... 10 2007 058 072

(51) Int. Cl.
*H02K 1/06* (2006.01)
(52) U.S. Cl. ............................................... 310/216.131

(58) Field of Classification Search ........... 310/216.131, 310/216.128, 216.129, 216.134, 216.135, 310/216.058
See application file for complete search history.

(56) References Cited

U.S. PATENT DOCUMENTS

| | | | |
|---|---|---|---|
| 2,849,695 A | 8/1958 | Schaefer | |
| 4,469,973 A * | 9/1984 | Guyot et al. | 310/433 |
| 4,603,273 A * | 7/1986 | McDonald | 310/89 |
| 5,534,736 A * | 7/1996 | Johnson | 310/91 |
| 6,628,027 B2 * | 9/2003 | Fuller | 310/91 |
| 7,397,163 B2 * | 7/2008 | Cook et al. | 310/216.051 |
| 7,821,177 B2 * | 10/2010 | Onimaru et al. | 310/216.129 |
| 2006/0091759 A1 | 5/2006 | Migita et al. | |

FOREIGN PATENT DOCUMENTS

| | | |
|---|---|---|
| DE | 1 020 720 | 12/1957 |
| DE | 102 61 617 | 7/2004 |
| GB | 384924 | 12/1932 |
| GB | 1100589 | 1/1968 |

* cited by examiner

*Primary Examiner* — Nguyen N Hanh
(74) *Attorney, Agent, or Firm* — Merchant & Gould P.C.

(57) ABSTRACT

The invention relates to an electric motor having a stator and a rotor in a housing, wherein the stator comprises a plurality of lamellae that are disposed in parallel and are combined into a package. The lamellae are held together via a spring clamp, which overlaps the lamella package in an axial manner, wherein the spring clamp simultaneously supports the lamella package radially on the interior wall of the housing.

12 Claims, 6 Drawing Sheets

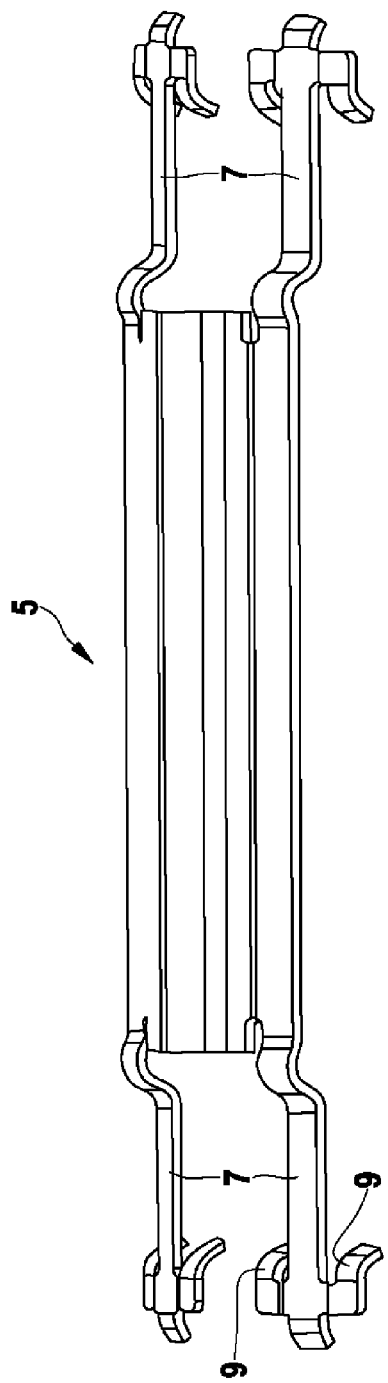
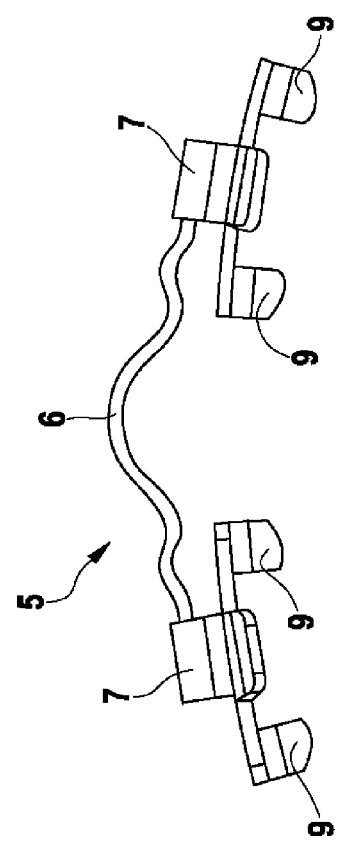

ELECTRIC MOTOR

This application is a National Stage Application of PCT/EP2008/063826, filed 15 Oct. 2008, which claims benefit of Serial No. 10 2007 058 072.1, filed 3 Dec. 2007 in Germany and which applications are incorporated herein by reference. To the extent appropriate, a claim of priority is made to each of the above disclosed applications.

BACKGROUND

An electric motor is described in the German patent publication DE 102 61 617 A1 comprising a stator package fixedly arranged in a housing, wherein a rotor is rotatably mounted, which is driven by the production of an electromagnetic stator field. The stator package is braced, fixed and positioned to the housing by means of resilient clamping means, which are embodied as clamping sleeves. A plurality of said clamping sleeves are arranged so as to extend in the longitudinal direction of the axis and to be distributed over the periphery between the outer surface area of said stator package and the inner surface area of said housing. Said clamping sleeves, respectively pins, are of hollow-cylindrical construction and are composed of spring steel, whereby a resilient force, which is effective as a clamping force between said stator package and said housing, is produced in the radial direction of said clamping sleeves.

The stator package can as, for example, described in the US patent publication 2006/0091759 A1 be constructed from a plurality of individual lamellae, which are axially arranged one behind the other and form the package, wherein said lamellae receive a stator winding. Said lamellae are axially held together by means of suitable clamping means.

SUMMARY

The underlying aim of the invention is to connect a stator package in an electric motor consisting of stacked up individual lamellae to the housing of said motor in a manner that ensures high mechanical strength and thermal durability. Said aim is to be accomplished using simple, constructional measures.

The inventive electrical machine, which particularly relates to an electric motor, which, for example, is used in an auxiliary unit of a motor vehicle like windshield wipers, window lifters or the like, comprises a stator arranged in a housing as well as a rotatably mounted rotor, wherein said stator is configured with a plurality of lamellae arranged parallel to one another and combined to form a stator package. Said lamellae serve to receive the stator winding and furthermore provide for a better conductivity of the magnetic flux, whereby efficiency is improved. When said stator winder is supplied with a corresponding current, an electromagnetic stator field is produced, by which the rotor is driven. Said electrical machine particularly relates to an internal rotor motor.

The lamellae, which are a component of the stator package, are held together via a spring clamp, which overlaps the lamella package in an axial manner. In addition, preferably a half-cylindrical or partially cylindrical part of the spring clamp supports said lamella package radially on the interior wall of the housing. Said spring clamp therefore serves two purposes: on the one hand said lamellae of said lamella package, respectively said stator package, are held together in an axial manner and on the other hand said lamella package is fixed in position by the production of a radial force in said housing, thus enabling the position of the package in the housing to be fixed in the axial direction as well as in the circumferential direction, a force fit advantageously being formed in the axial direction and a positive fit in the circumferential direction. The radial clamping force can like the axial clamping force can be selected such that the package is reliably held in the housing beyond its required minimum service life when used under conditions that are typical for the intended use of the electrical machine. The necessary mechanical strength and stability of the connection is particularly achieved by said axial and radial clamping force. In addition the connection is of high quality and is also temperature resistant, because longitudinal expansions, respectively contractions, do not lead to any or at least not to any significant weakening of the required clamping force in the axial and radial direction. Force/travel characteristic curves are designed according to the actual need. Mechanical effects like shocks and vibrations also do not weaken said connection. In comparison to embodiments from the technical field, oscillations and noises are dampened considerably better.

A further advantage is that only one component is required to hold the lamellae in the axial direction and furthermore to connect the lamella package to the housing. According to a particularly advantageous embodiment, the forces acting in the axial direction on the one hand and the forces acting in the radial direction on the other hand can be adjusted independently of one another via a corresponding constructional configuration of the spring clamp. This is achieved, for example, as a result of said spring clamp including a spring-loaded back and furthermore at least one clamping base in each case on the opposite sides of said spring-loaded back, wherein the opposing clamping bases axially hold the lamellae together and the radial clamping force can be adjusted with respect to the housing via the constructional design of said spring-loaded back. The clamping bases are in contrast not involved in radially supporting, respectively clamping, the stator package with respect to said housing.

According to a further advantageous embodiment, provision is made for at least two clamping bases in each case to be on each of the opposite sides of the spring-loaded back, so that the spring clamp has in total at least four clamping bases. These advantageously form an angle with said spring-loaded back and lie against the lateral surface of the lamellae, which in each case are on the end face, in the stator package. It can be advantageous in supporting and improving the axial clamping effect to increase the number of clamping bases and if need be to form a contact curvature in said clamping bases, which lies in contact with the lamella. Said contact curvature allows said clamping bases to be easily slid, respectively inserted, onto the lamella package in a radial direction by said contact curvature radially sliding along the lateral surface of the lamellae on the end face until achieving the final end position during installation of the spring clamp.

Furthermore, it can be advantageous to configure a shoulder between the clamping bases and the spring-loaded back, which, for example, simulates the contour of a support ring, which overlaps the lamellae in a radial manner. The spring clamp lies with said spring-loaded back against the outer face of the support ring, said spring-loaded back ascending radially with respect to said outer face. In the case of the construction of said support ring being axially shortened, the shoulder between said clamping bases and said spring-loaded back can compensate for a corresponding shoulder between said support ring and the outer surface area of the lamella package.

The spring-loaded back is advantageously designed so as to be curved, the curvature extending radially outwardly and projecting beyond the outer surface area of the lamella package, respectively the support ring surrounding said package, in the radial direction. Said curvature takes on the function of the radial spring element by being radially compressed when the stator package is inserted into the housing; however, due to its inherent elasticity said curvature seeks to assume its initial position, whereby the radial clamping force is generated.

It may be advantageous to form a groove-like recess in the spring-loaded back extending in the axial direction, which facilitates a radial compression of the spring element during insertion into the housing. In addition a clamping pin can be inserted into the groove, which projects radially with respect to the curvature and for one thing can generate an additional spring force, particularly for the case, in which the pin is designed to be inherently elastic.

The spring clamp is advantageously manufactured as a punched and bent part of metal, particularly of stainless steel for a better resistance to corrosion.

Additional advantages and advantageous embodiments can be taken from the sub-claims, the descriptions to the figures and the drawings. The following are shown:

DETAILED DESCRIPTION

Figure 1:
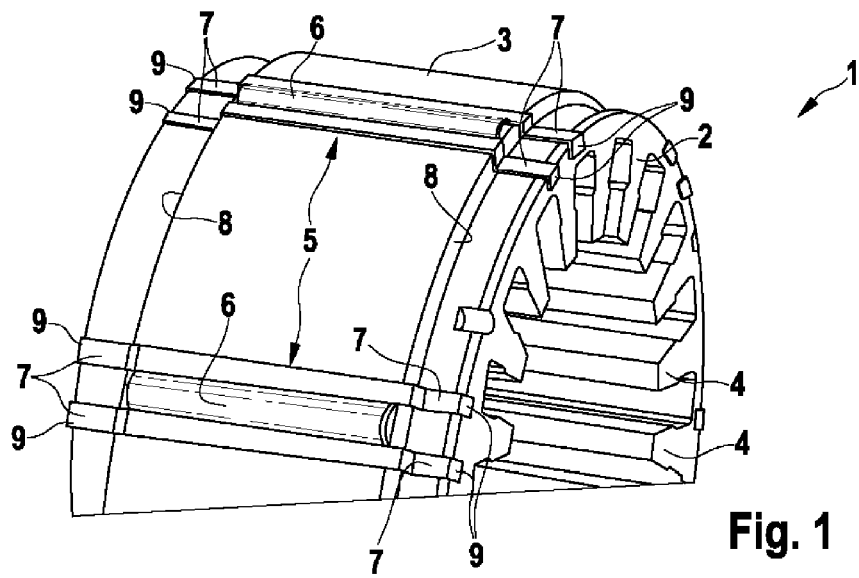
FIG. 1 a perspective view of a stator for an electric machine as, for example, an electric motor or generator, wherein the stator is embodied as a lamella package having a plurality of individual, parallel lamellae, which are overlapped by a support ring, having a spring clamp, which overlaps the lamella package in an axial manner, wherein the spring-loaded back of said spring clamp projects beyond the outer surface of said support ring, FIG. 2 the stator according to FIG. 1 as seen in a view of the end face, FIG. 3 the stator in the installed position in the housing, wherein the spring-loaded back rests against the interior wall of said housing and transmits a radial clamping force, FIG. 4 a view of the outer surface of a stator having the spring clamp in a modified embodiment, FIG. 5 the stator according to FIG. 4 as seen in a view of the end face, FIG. 6 a perspective depiction of the spring clamp, which is used in the exemplary embodiment according to FIGS. 4 and 5, FIG. 7 the spring clamp as seen in a front view, FIG. 8 the spring clamp as seen in a side view, FIGS. 9 to 11 the spring clamp in an additional embodiment in two perspective views and as seen in a view of the end face.

The same components are denoted with the same reference numerals in the figures.

Figure 2:
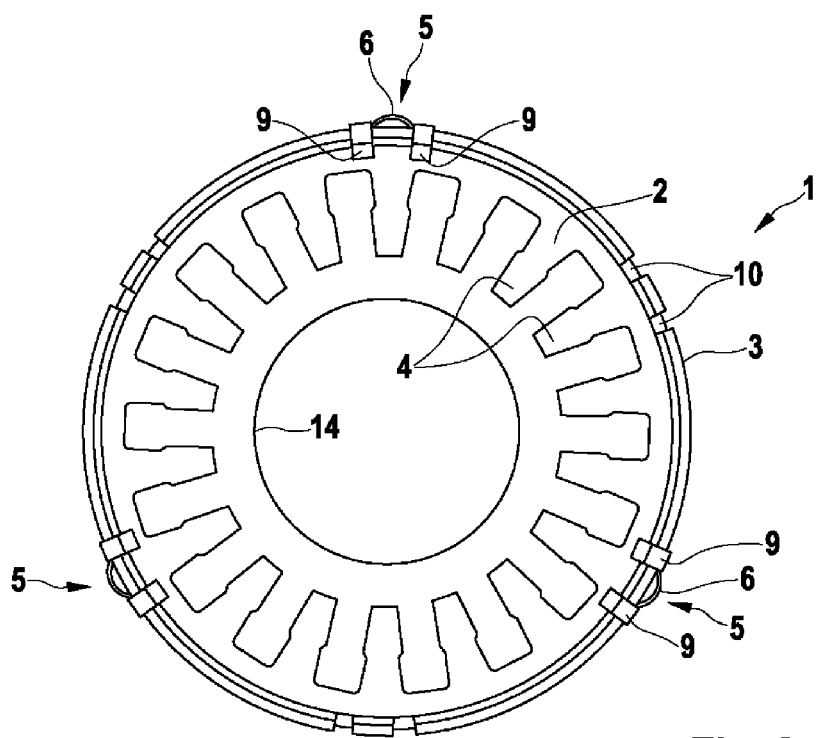

As depicted in FIGS. 1 and 2, the stator 1, which is a component of an electric machine, particularly an electric motor, respectively generator, consists of a stator 1, which comprises a plurality of individual lamellae 2 that are disposed in parallel and are combined into a package. The lamellae are disposed laterally to the longitudinal axis and include in each case a plurality of lamella teeth 4 that are circumferentially distributed and extend radially inwards. Said lamellae and lamella teeth 4 receive the stator winding, via which the electromagnetic stator field that drives the rotor is produced. Said lamellae 2 are overlapped by a support ring 3 that is not overwound, respectively not punched. The support ring 3 has a smaller axial length than the lamella package so that a shoulder 8 is formed in each case between the end faces of said support ring 3 and the end faces of said lamella package.

Provision is made for a plurality of spring clamps 5 to be distributed over the circumference of the stator 1. The spring clamps 5 hold the lamella package together and impinge the individual lamellae 2 with an axial force acting on both end faces. Each spring clamp 5 consists of a spring-loaded back 6 and in total four clamping bases 9, which are integrally configured with the spring-loaded back 6, two clamping bases 9 being disposed in each case on opposite sides of said spring-loaded back 6. The clamping bases 9 are bent, particularly bent at approximately 90E, with respect to the plane of said spring-loaded back 6, which extends in the axial direction. In so doing, said clamping bases are connected to said spring-loaded back 6 via a clamping extension 7. Said clamping extension 7 is adapted to the geometry of the pre-punched, respectively turned, shoulder 8 between the end faces of the support ring 3 and the lamella package of the lamellae 2.

The spring-loaded back 6 is designed so as to be curved, the curvature extending in the circumferential direction of the lamella package. As a result of said curvature, said spring-loaded back 6 ascends radially vis-B-vis the circumferential outer surface of the ring 3, which is not overwound, respectively punched. A corresponding contour adapted to the spring-loaded back can be formed in the outer surface of said ring 3 for receiving said spring-loaded back. In this case, the lateral sections of said spring-loaded back are accommodated in the contour, whereas the middle section ascends radially above the outer surface due to said curvature.

As can be seen in the view of the end face of the stator 1 according to FIG. 2, a plurality of spring clamps 5 is arranged so as to be uniformly distributed over the circumference of said stator 1. The curvature of the spring-loaded back 6 is on average configured to be partially circular. In FIG. 2, different contours are arranged so as to be distributed at various angle positions over the circumference of said stator 1, which are configured in the form of grooves 10 and serve to receive the lateral sections, respectively the clamping extensions 7, of the spring clamps 5. The rotor 14, which is rotatably mounted in the interior of said stator 1, is also delineated in FIG. 2.

Figure 3:
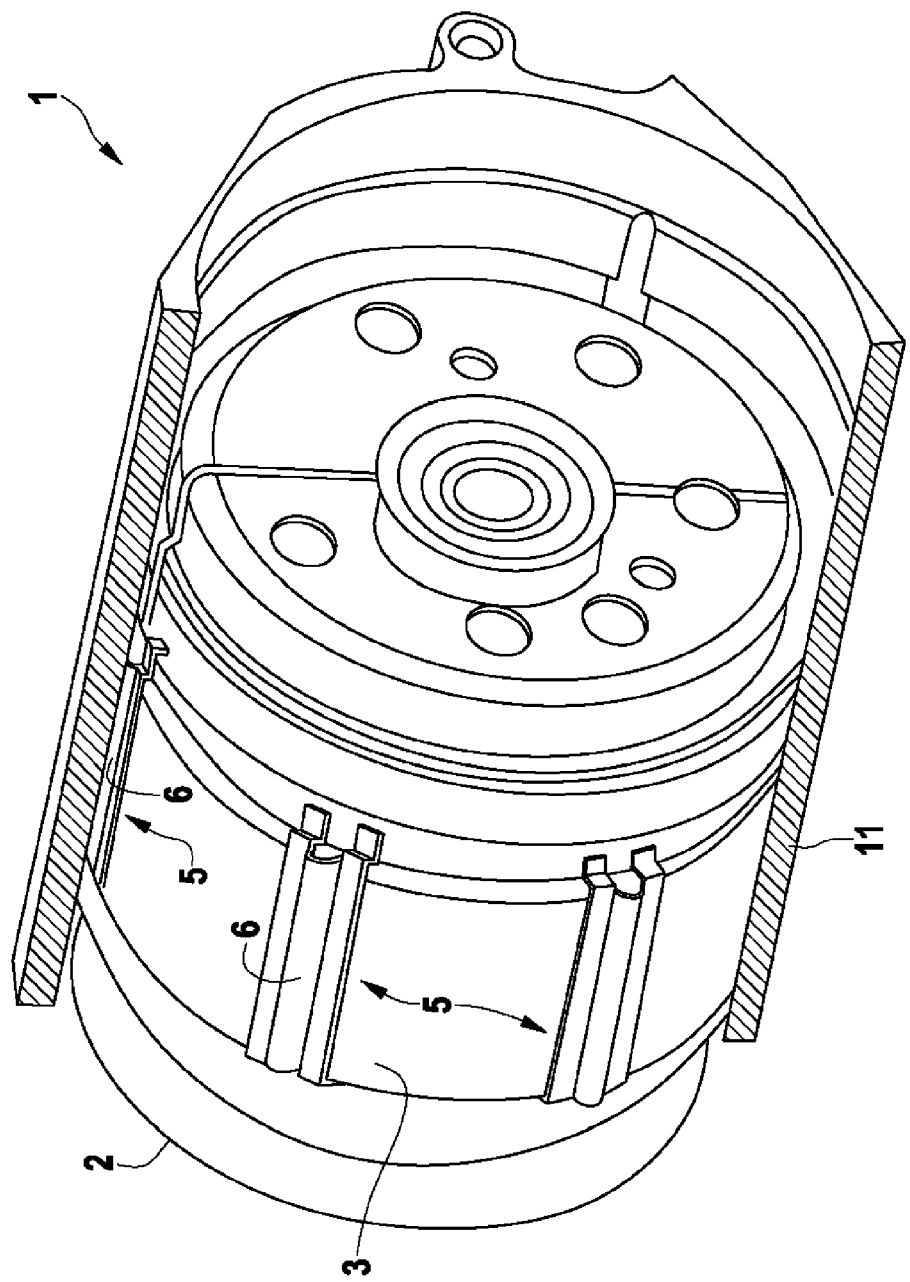

In FIG. 3, the stator 3 is depicted in the installed position, respectively shortly before achieving the final axial installation position in the housing 11. Because the spring-loaded backs 6 of the spring clamps 5 project radially over the outer surface of the ring 3, a radial contact between said spring-loaded back 6 and the interior wall of the housing is provided in the installation position, whereby a clamping force is exerted that fixes the stator 1 in the desired position in the axial direction as well as in the circumferential direction.

A further exemplary embodiment is depicted in FIGS. 4 to 8, which differs with respect to the first exemplary embodiment according to FIGS. 1 to 3 by a slightly modified spring clamp. The spring clamp 5 includes in its spring-loaded back 6 a recess in the form of a groove extending in the axial direction, which is produced by means of a corresponding forming process of the bent, respectively punched, part, from which the spring clamp is manufactured. The recess 12 increases the spring effect in the radial direction, thus enabling a greater elasticity to be provided in said radial direction. The groove-like recess 12 can also be used to receive, respectively position, a pin, which is inserted into said recess 12 and rests against the interior wall of the housing in its inserted position.

Figure 4:
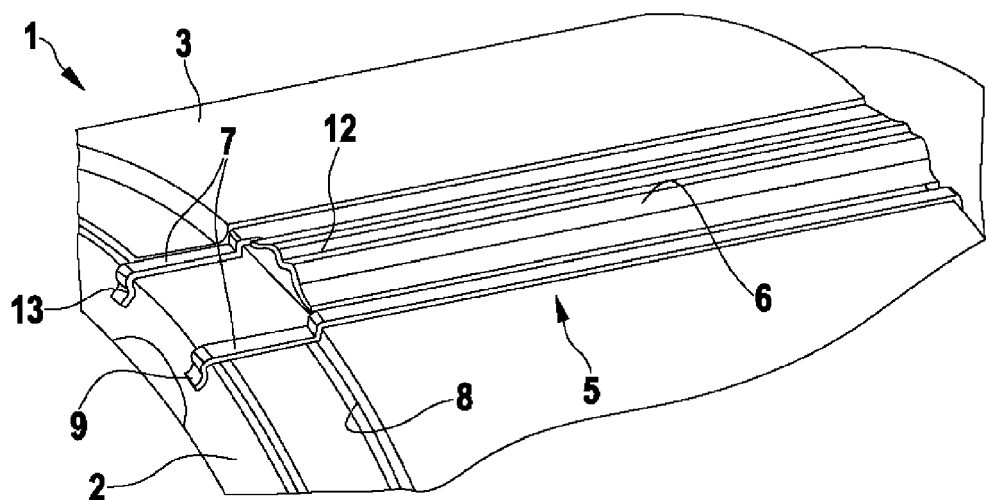
Figure 5:
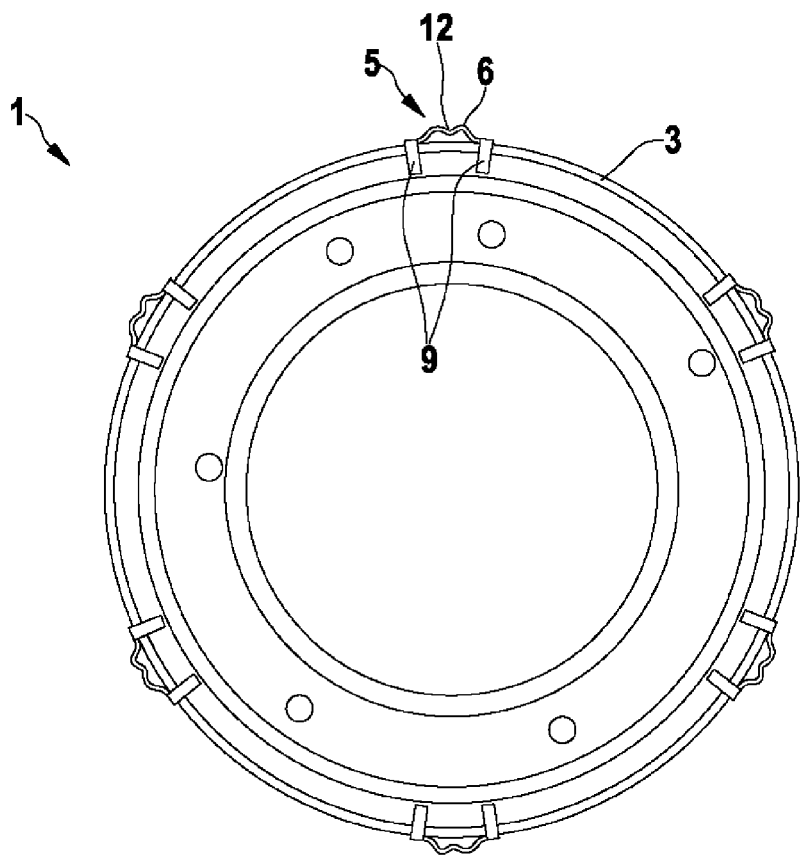
Figure 6:
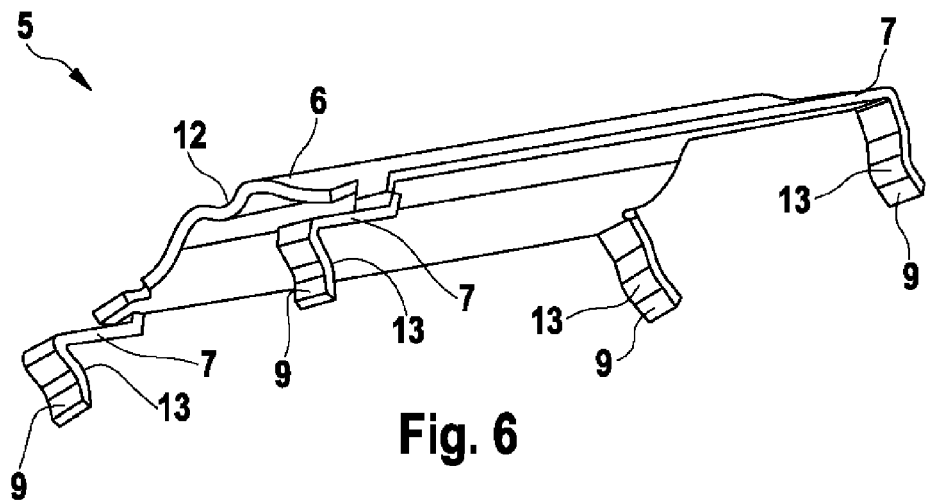
Figure 7:
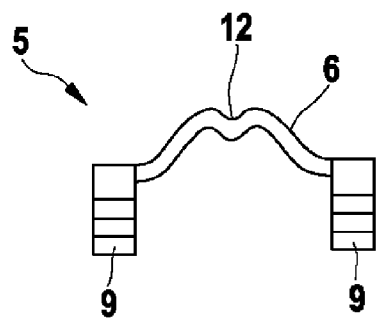
Figure 8:
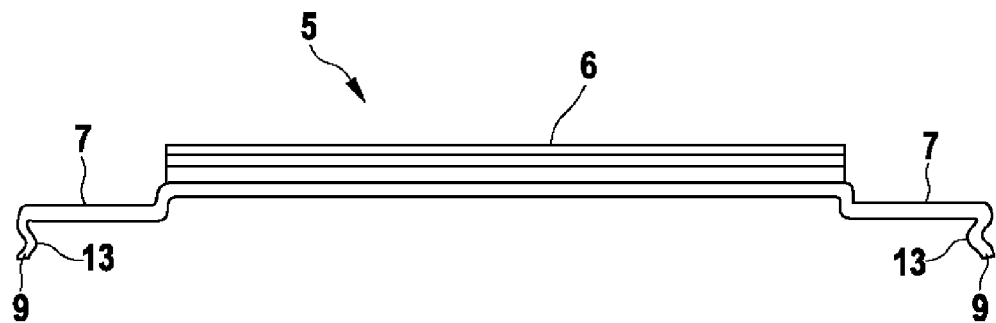

As can be seen in FIGS. 4, 6 and 8, a contact curvature 13 is introduced into the clamping bases 9, said curvature 13 resting against the lateral surface of the lamellae on the end face in the installed position of the spring clamp 5. Said contact curvature 13 facilitates the assembly process by said clamping bases 9 being able to glide with said contact curvature 13 radially along the outside lateral surface of the lamellae 2 on the end face.

Figure 9:
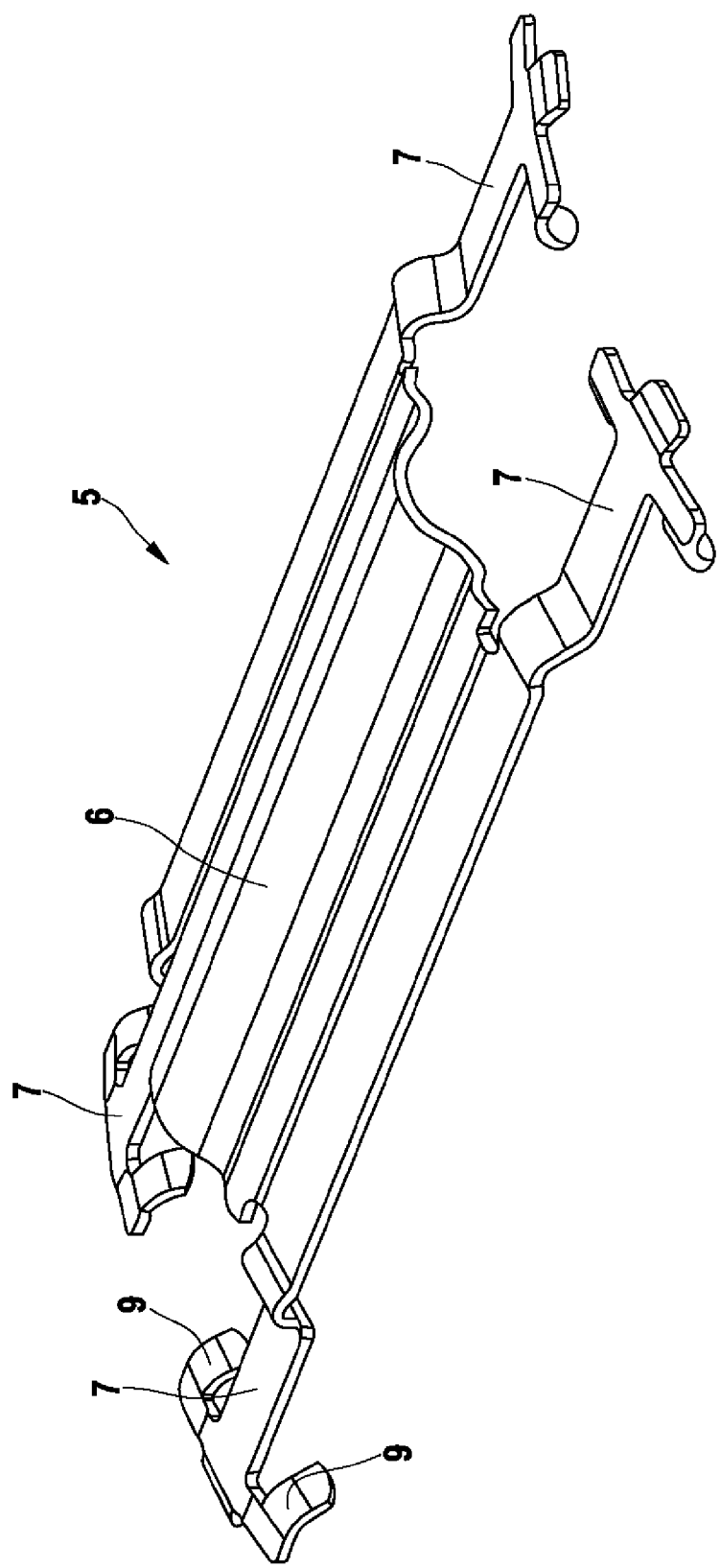

The spring clamp 5 is depicted in an additional embodiment in FIGS. 9 to 11. Said spring clamp 5 includes in total four clamping extensions 7, of which two clamping extensions are situated in each case on each end face. Said clamping extensions 7 are configured as components integrally embodied with the base body of the spring clamp 5, which project in the axial direction. Each clamping extension 7 includes two clamping bases 9 that extend on each side and are likewise integrally configured with said clamping extension 7. These two clamping bases 9 are disposed in the region of the free end face of each clamping extension 7 in such a manner that they extend laterally in parallel to said clamping extension. Each clamping base 9 has a downwardly projecting curvature, which leads out of the plane of said clamping base 9 and is directed downwards and thereby includes a component in the direction of a normal to the mid-plane of the spring clamp. The free end face of each clamping base 9 faces the end face of said spring clamp 5.

The invention claimed is:

1. Electric machine, particularly electric motor, respectively generator, having a housing, a stator disposed in the housing and a rotor, wherein the stator comprises a plurality of lamellae that are disposed in parallel and are combined into a package, wherein the lamellae are held together via a spring clamp, which overlaps the lamella package in an axial manner, and in that the spring clamp simultaneously supports said lamella package radially on the interior wall of said housing.

2. Electric motor according to claim 1, wherein the spring clamp includes a spring-loaded back and at least one clamping base in each case on opposite sides of the spring-loaded back.

3. Electric motor according to claim 2, wherein the clamping bases are bent with respect to the spring-loaded back.

4. Electric motor according to claim 2 wherein a contact curvature is formed in the clamping bases, which rests against a lateral surface of a lamella in the installed position.

5. Electric motor according to claim 2, wherein two clamping bases are provided in each case on opposite sides of the spring-loaded back.

6. Electric motor according to claim 2, wherein a shoulder is formed between the clamping bases and the spring-loaded back.

7. Electric motor according to claim 2, wherein the spring-loaded back is curved.

8. Electric motor according to claim 2, wherein a groove-like recess extending in the longitudinal direction of the spring clamp is formed in the spring-loaded back.

9. Electric motor according to claim 1, wherein the lamellae are overlapped by a support ring, on whose exterior side the spring clamp rests.

10. Electric motor according to claim 1, wherein the spring clamp is manufactured as a punched and bent part of metal, particularly of stainless steel.

11. Electric motor according to claim 1, wherein the clamping bases are disposed on a clamping extension, which is connected to the spring-loaded back.

12. Electric motor according to claim 11, wherein two clamping bases are disposed on the clamping extension.

* * * * *